United States Patent [19]
Takasaki et al.

[11] Patent Number: 5,217,332
[45] Date of Patent: Jun. 8, 1993

[54] DRILL BIT FOR ADVANCED MATERIALS

[75] Inventors: Kazuo Takasaki; Yasunori Murakami, both of Gifu; Hiroshi Kasutani, Gifu; Koji Hashimoto; Yutaka Adachi, both of Nagoya, all of Japan

[73] Assignees: Mitsubishi Materials Corporation; Mitsubishi Jukogyo Kabushiki Kaisha, both of Japan

[21] Appl. No.: 880,047

[22] Filed: May 7, 1992

[30] Foreign Application Priority Data

Jan. 7, 1992 [JP] Japan .................. 4-001005

[51] Int. Cl.⁵ ........................... B23B 51/00
[52] U.S. Cl. ........................ 408/145; 408/59; 408/227; 408/144
[58] Field of Search ............ 407/119; 408/57, 59, 408/144, 145, 227, 229, 230

[56] References Cited

U.S. PATENT DOCUMENTS 5,065,647 11/1991 Johnson .................. 408/144 X
5,137,398 8/1992 Omori et al. ............. 407/119 X

*Primary Examiner*—Steven C. Bishop
*Attorney, Agent, or Firm*—Scully, Scott, Murphy & Presser

[57] ABSTRACT

A high performance drill bit is presented for precision drilling of holes in hard-to-drill materials, such as a carbon fiber reinforced plastic material. The drill is a gun drill type having a pair of flat flutes and a pair of air holes for delivering coolant and/or lubricant. The main feature of the drill is the provision of two pairs of cutting edges formed on the intersecting ridges formed at the leading sides of the flank surfaces with the flute surfaces. At the tip of the drill bit, a pair of primary cutting edges, having a point angle $\alpha$, is disposed. It is followed by another pair of secondary cutting edges, having a point angle $\beta$, where $\alpha > \beta$. Physically, this means that the secondary cutting edges are inclined more toward the drill axis than the primary cutting edges. The secondary cutting edge is followed further by another flank surfaces which are even more inclined toward the drill axis.

6 Claims, 4 Drawing Sheets

DRILL BIT FOR ADVANCED MATERIALS

FIELD OF THE INVENTION

The present invention relates to a high performance drill bit ideally suited for use in making drill holes in advanced materials such a fiber-reinforced plastics (FRP), including carbon fiber reinforced materials.

PRIOR ART

Among the many fiber reinforced plastic materials available today, carbon fiber reinforced plastics (CFRP) have advantages compared with metals in many engineering aspects, such as relative toughness, strength, fatigue resistance, wear resistance, chemical resistance and vibration damping, and they are being used in many applications ranging from advanced aerospace products to daily goods.

With such changes in the application trends, there is also a shift from uses in secondary structural components to those in primary structural components. Further, the fabricated components are changing from small simple components to large complex components. Such a change in CFRP component manufacturing trend resulted in a need for economic production, and a need to satisfy precision machining and high productivity requirements simultaneously.

FIGS. 5 to 9 show some examples of conventional drill bits for drilling FRP materials. Of these, those shown in FIGS. 5 to 7 are known as gun drills, and they are designed to be used in conjunction with a drilling machine (not shown) in which the body 1 is attached to a drill chuck. Typically, a gun drill bit consists of a body 1 having a cylindrical driver 2 concentric with the drill axis 0 of the body 1, a shank 3 attached coaxially with the driver portion 2 and a cutting bit 4 made of hard metals such a superalloys fixed firmly to the shank 3 by such means as brazing.

Surrounding the body 1 is a chip removal flute 5 (hereinafter referred to as the flute) having an opening at the tip of the bit 4 and extending along the drill shaft toward the base of the body 1.

The base end (as opposed to the tip end) of the flute 5 is shaped so that there is a face 5a which faces in the direction of the drill rotation (in FIG. 7, the counter clockwise direction) and a face 5b which faces in the clockwise direction, and in the cross sectional view, perpendicular to the drill axis O, the face 5a has a V-shape. The tip of the cutting bit 4 and the opening of the flute is connected through a flank 6 towards the trailing side to the rotation direction (as opposed to the leading of the rotation direction).

At the tip of the bit 4 is disposed a cutting edge 7, along the ridge line formed by the intersection of the face 5a with the leading edge of the flank 6, extending from the center C of the body 1 towards its outer circumferential region.

On the interior of the body 1 is disposed a tubular passage 8 passing through the body 1 along the drill axis O, from the bit 4 through the shank 3 to reach the driver portion 2. This tubular passage 8 is for the purpose of supplying air or lubricant to the cutting location, for cooling and chip removal, and its opening is located at the surface of the flank 6 of the cutting bit 4.

On the other hand, the drill bit shown in FIG. 8 is known as the flat flute drill. This type of drill has a body 11, composed of hard metals such as superalloys, is disposed a pair of slanted flat surface 12 extending from the tip towards the base of the body 11 symmetrically along the drill axis 0. A pair of arrowhead-shaped cutting surfaces 13 are formed at the tip end of the slanted surface 12 by a pair of receding surfaces at the edges thereof, extending from the center C towards the outer periphery of the body 11.

The cutting action is provided by a pair of cutting edges 14 at the tip end of the body 11 formed by the intersecting ridges of the leading cutting surfaces 13 with the slanted surfaces 12, and the point angle $\theta 1$ is usually set at an acute angle.

Further, in FIG. 9 is shown a drill bit commonly known as a twist bit. This type of drill has a body 15 having a pair of spiralling flutes 16, and a pair of cutting edges 17 formed by the intersecting ridges of the tip end of the spiral flute 16 with the body 15. The point angle $\theta 2$ is usually set at an obtuse angle.

In the following, the problems with the twist drill bit of the conventional designs are discussed in detail. The are problems with manufacturing as well as the use of such drill bits.

The gun drills shown FIGS. 5 to 7 have only one cutting edge 7, and there is a considerable load imposed on the body 1 during the drilling operation, because of the resistance at the cutting edge. Furthermore, the resistance force is not constant during the drilling operation, and the drill axis can drift in the radial direction, or result in such quality problems as enlargement of the hole, ovality and deterioration in the machined surface quality.

Further, because there is only one edge, the rate of removal of the material is limited, and the feed rate cannot be increased as desired.

In the case of the flat flute drills shown in FIG. 8, because the two cutting edges 14 are formed at the tip of the body 11 symmetrically around the drill axis 0, the radial components of the resistance force in the cutting edge 14 are mutually cancelled, thus preventing undue vibration of the drill, and further the theoretical cutting rate is doubled because there are two cutting edges.

However, in manufacturing such a drill bit, the center of the drill axis O of the body 11 must be aligned precisely with the center of the pair of symmetrical cutting edges 14. This is not a simple process and there are many chances of introducing slight misalignment during manufacturing of the bits.

A misaligned drill bit produces many fabrication problems during drilling. The tip portion of such a drill bit defines the center of rotation of the drill bit by biting into the material in the initial stage of the drilling operation, thereby providing the rotational stability in drilling. In the meantime, the circumferential region of the drill bit determines the precision of the hole size, which depends on the stable rotating action of the cutting edges to follow. If the center of the tip is not coincident with the rotational center of the drill axis, it leads to vibration of the drill during the drilling operation thus causing problems of machining rejects, due to such quality problems as hole size enlargement, ovality and poor surface quality.

Further, it is difficult to provide airholes on the flank surface of flat flute drills although they can be made available in the previously described gun drills. Because of the acute point angle $\theta 1$ of the cutting edge 14, the angle of the slanted surface 12 becomes sharp, and the opening of the airhole in will be located far away from the cutting tip where the delivery of coolant and lubricant is most critically needed.

For this reason, it is difficult to deliver sufficient air and lubricant to the critical region of the cutting edge 14, causing further machining problems of temperature rise, binding and general increase in cutting resistance. The rise in temperature is particularly undesirable in such materials as CFRP, because of possible properties degradation in certain type of resin materials.

Further problem with the flat flute drills, compared with the twist drills, is that because of the acute angle of the flute, there is a tendency for the cutting edge 14 to become long. This lengthens the time interval between the first drill bite to the actual dimensional drilling of the hole, and results inevitably in increasing the total machining time. It is further difficult to maintain such a long bladed cutting tool from bending or otherwise becoming damaged.

In the case of the twist drills shown in FIG. 9, because of the obtuse point angle, it is possible to install air passage near the drill axis as well as to avoid the problems of maintenance and increased machining associated with the sharp angled flat flute drills.

However, because of the presence of two cutting edges 17, it is difficult to avoid the previously described problems caused by the misalignment of the drill axis O and the axis of symmetry of the pair of cutting edges, thereby causing the same problems as in the flat flute drills of ovality and surface quality.

Further problem associated with such obtuse angle drill bits is that, compared with the sharp pointed drills, the initial bite of the cutting edge 17 is relatively weak. The drilling action of twist drills therefore involves spreading apart of the material in the biting area, thus lacking in the precise location and longitudinal guiding actions of the tip of the cutting edge. The twist drill bit therefore exhibits a tendency to drift, thus aggravating the problems of ovality and surface quality.

Further, because the drill operates by pushing and spreading the material, there is a strong thrust force exerted on the material, and near the base end of the machining hole, the vertical force can sometimes be sufficient to break through the material prematurely, thus generating burrs around the drilled hole. Such a problem occurs particularly frequently in CFRP materials. Further, the spiral shape of flute 16 in the twist drills is prone to making long stringers, and it become difficult to discharge such chips efficiently from the bottom of the drill holes.

In addition to the problems mentioned above, although many of the gun drills, flat flute drills and twist drills are made of superalloys or tool steels, the wear rate of the bits is severe especially when machining such material as CFRP. Therefore, the machining quality of a drill bit cannot be maintained for long, and the number of holes which can be made with one drill becomes limited. This problem is particularly detrimental to the productivity of automated production lines, and is an important factor in improving the economy of CFRP products for wider applications.

SUMMARY OF THE INVENTION

The objective of the present invention is to present a drill bit for use in advanced materials which would simultaneously satisfy both the precision fabrication and high productivity requirements.

One of the design requirements for such a drill bit is to provide two cutting edges of special design and two flutes.

The invented drilling bit for making precision drill holes in workpieces of advanced materials such as carbon fiber reinforced plastic materials, has a cylindrical body extending between a forward end of a rear end thereof, and the cylindrical body has the following features;

an axis of rotation extending longitudinally through the cylindrical body so that the drilling bit is functionally rotatable thereabout in one direction; two flutes formed in the lateral peripheral surface of said cylindrical body so as to extend longitudinally from said forward end, each flute having a wall facing toward the direction of rotation;

two flanks formed at said forward end of the cylindrical body;

two cutting edges formed along respective intersections of the flanks and said walls of the flutes, said cutting edges slanting to the rear end;

a pair of tubular air holes having openings at said two flanks respectively and extending from said openings to said rear end through said cylindrical body; and two hard portions provided at each circumferential portion of said cutting edges respectively, said hard portions being harder than other portions of said cutting edges.

A drill bit having such design features outperforms the drill bits of the conventional design because of the many advantageous as discussed below.

First, because there are two sets of symmetrically placed pair of cutting edges provided by the primary and the secondary flank surfaces (in contrast to the conventional drills having only one pair of flanks), the radial components cancel each other, and there is no net force acting on the drill body during the drilling operation, thus minimizing the drill vibration.

Second, because there are two sets of cutting edges, the material removal rate is doubled.

Third, because of the presence of the harder part (than the primary or secondary cutting edges) on the secondary flank, the rotational stability of the body is maintained, and the hard part retains the cutting tip at the correct position. Even if a new bit does not have its rotational center of the tip coincident with the rotational center of the body, as the drilling operation is continued, the wear of the tip occurs in such a way to make the two axes of rotation coincide with each other.

In contrast, in the conventional design of similar shaped drills, the hardness is uniform throughout the drill body, thus introducing rapid local wear and edge blunting at the cutting points where the resistive load is high, leading to overloading of the drill bit and ultimately to its failure.

Fourth, the coincidence of the two axes of rotation results in no vibration of the drill bit and results in a quiet drilling operation without much noise generation, and the production of high precision high quality machined products, especially with such difficult to drill materials as CFRP.

Six, by providing the primary point angle of relatively large magnitude, it becomes possible to locate the airhole closer to the rotation center thus enabling to deliver coolant and lubricant to the area most effective for drilling. Such a design also shortens the overall length of the cutting edges, and results in a faster and sturdier drill bit.

Seven, the spreading effect, which is often observed in drilling operations with twist drills of the conventional design, is minimized. This is because of the presence of the secondary cutting edges of smaller point angle compared with the conventional design thus minimizing the thrust load required to effect drilling. This has a further benefit of lessening the amount of burr which are usually produced by the drills of the conventional design.

Further and most importantly, by providing a hard cutting part in a part of the circumferential cutting edge most susceptible to wear, the overall service life of the drill bit is increased significantly, leading to improved drilling efficiency and productivity, especially in automated production lines of such difficult to drill materials as CFRP. In the following, the above mentioned advantages of the invented drill bit will be illustrated by way of preferred embodiments and some experimental demonstration of the effectiveness of the invented drill bit.

PREFERRED EMBODIMENTS OF THE INVENTION

A preferred embodiment is explained with reference to FIGS. 1 to 3.

Figure 1:
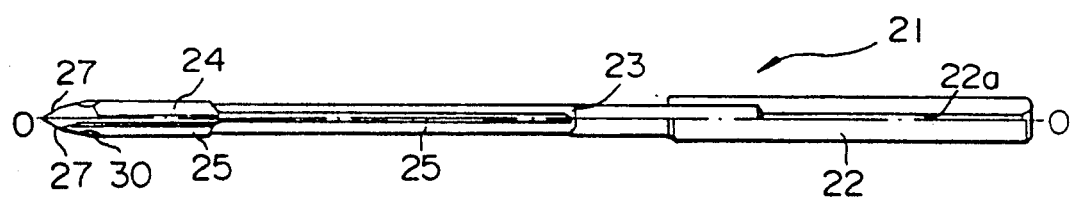
FIG. 1 is a side view of a drill bit in an preferred embodiment.

The invented drill bit is designed for used with a drilling machine, and as shown in FIG. 1, consists of a body 21 having a rotatable cylindrical driver 22 around the drill axis O of the body 21, a rod-shaped shank 23 attached coaxially to the center hole 22a of the driver 22 and a cutting bit 24 made of hard metals such as superalloys fixed firmly to the shank 23 by such mean as brazing.

A pair of flat flutes 25, with its opening disposed at the tip region of the cutting bit 24, surrounds the drill axis O and extends along the drill axis O from the cutting bit 24 towards the base of the bit and ending at the shank 23. The base section of each of the flutes is shaped by two types of wall surfaces; one wall surface 25a facing in the direction of the drill rotation and the other wall surface 25b facing in the opposite direction to the drill rotation. These wall surfaces 25a and 25b are illustrated in FIG. 3, which is a cross sectional view taken perpendicular to the drill axis O, and the direction of rotation (indicated by the arrow is counter clockwise, because it is a view as seen from the tip end of the drill bit), and appears V-shaped. The wall surfaces facing in the same direction, i.e. the two surfaces 25a, are oriented parallel with each other and the other surfaces 25b are oriented parallel with each other.

The tip end of the drill bit is constructed such that the leading flank surface 26 is slanted in the trailing side of the rotation direction, and the opening of the flute 25 is disposed near the tip region.

In the embodiment, the leading flank 26 is composed of a primary and a secondary and a tertiary flank surfaces 26a, 26b and 26c. The flank surfaces 26a is disposed closer to the tip and 26b is disposed closer to the base section of the body 21, and they are both inclined in the trailing side to the rotation direction. They are oriented so that their surfaces face toward the outer periphery of the body 21 and toward the bas section of the body 21. The tertiary flank surface 26c is also slanted in the trailing side to the rotation direction, and faces toward the periphery and to the base of the body 21. In reference to FIG. 2, which shows the point angles $\alpha$ and $\beta$, the orientation angles (with the drill axis O) of the primary flank surface 26a, $\alpha/2$, and of the secondary flank surface 26b, $\beta/2$, are chosen such that $\alpha > \beta$.

Near the center section of the cutting tip, a pair of primary cutting edges 27a is formed by the intersecting ridges between the primary flank surface 26a and the wall surface 25a (which faces in the direction of drill rotation) of the flute 25. A pair of secondary cutting edges 27b is formed by the intersecting ridges, between the secondary flank surface 26b and the wall surface 25a, which extend to the circumference of the body 21.

Therefore, in the embodiment, the cutting edge 27 is composed of the primary and the secondary cutting edges 27a and 27b, respectively, which are disposed symmetrically with respect to the drill axis O, and are disposed so as to incline progressively in the trailing base side as they move away from the center of the rotation axis O.

As mentioned previously, the point angles $\alpha$ and $\beta$ are chosen so that $\alpha > \beta$, so as to aid in efficient drilling. The actual point angles in this embodiment were chosen to be 60° and 35°, respectively, for $\alpha$ and $\beta$.

In the interior of the body 21 is disposed a pair of tubular passages 28 along the axial direction of the drill, starting from the midsection 22a of the driver section 22, separating into two passages at the shank section 23 and reaching the cutting bit 24 at the opposite end. Each of the passages 28 terminates at the flute surface 26, and provides an opening, an airhole 29, on the flute surface.

Figure 3:
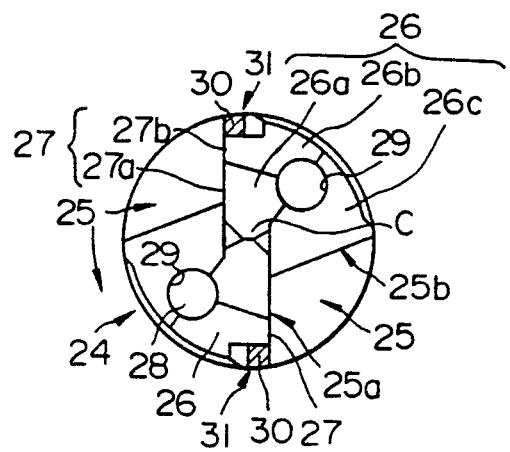
FIG. 3 is a enlarged end view taken from the tip end of the drill bit shown in FIG. 2.

In this embodiment, the airholes 29 are located, as shown in FIG. 3, at the apex of the ridges formed by the intersection of the primary, secondary and tertiary surfaces, 26a, 26b and 26c, respectively, of the leading flank surface 26.

Figure 2:
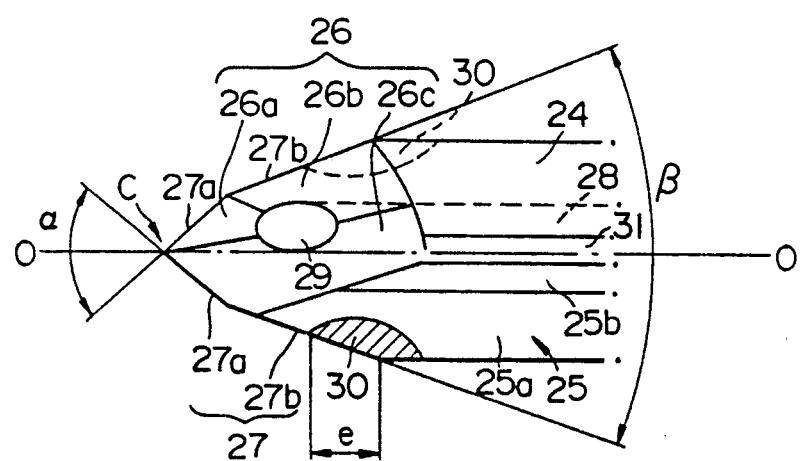
FIG. 2 is an enlarged side view of the cutting tip of the preferred embodiment shown in FIG. 1.

Further in this embodiment, as shown in FIG. 2, there is a fan-shaped high hardness cutting part 30 (termed hard part) disposed at the intersection region of the surfaces, formed by the wall surface 25a of the flute 25, the secondary flank surface 26b and the circumferential surface of the cutting bit 24. The circumference of the secondary edge 27b, comprising a part of the cutting edge 27, is constituted by the hard part 30.

The hard part 30 is composed of a sintered material, made primarily of diamond powder, firmly bonded to the depressed region 31 near the intersection of wall surface 25a, the secondary flank surface 26b and its circumferential surface. In this embodiment, the linear dimension "e" along the drill axis O of the hard part 30 is made to be about 3 mm. There is also a land 31 extending in the direction of the axial base section. The web section disposed on center of rotation C of the cutting edge 27 is thinned.

The drill bit having the above design features is able to mutually cancel out the radial force components acting on the cutting edge 27, thereby preventing the vibration of the drill axis caused by the changes in the component forces during drilling. As well, since there are two pairs of cutting edges 27, the cutting rate per single rotation of the drill is doubled compared with a single pair edge drill bit, thus achieving a higher feed rate and an improved drilling efficiency.

Further, by providing a hard part 30 having a higher hardness than that of the center section C on the circumferential region of the body 21 and away from the cutting tip, the cutting edge 27 wears faster than the hard part 30. Therefore, as drilling proceeds, the cutting edge 27 is guided by the circumferentially located hard part 30, and wears in such a way to maintain the coincidence of the axial symmetry of rotation of the cutting edges 27 and the drill axis 0.

Therefore, the misalignment in the axial centers of the cutting tip and the drill rotation can be corrected as the drilling operation is continued. In other words, the drill bit has a feature of self-correcting the misalignment which may exist in a drill bit. Therefore, the invented drill bit is able to prevent the vibration of the drill caused by the misalignment of the two axes of rotation, thereby improving the accuracy of drilling operation and the degradation in dimensional and surface qualities.

Further, by having the hard part 30 on the circumferential region of the cutting edge 27, the overall wear rate of the drill body 21 is decreased, and the service life of the drill bit can be increased significantly, thereby increasing the productivity of the drilling operation of such materials as advanced CFRP.

The drill bit of the invented design offers high wear resistance, high drilling performance and productivity while maintaining the drilling precision appropriate for the application.

In this embodiment, the linear dimension e of the hard part 30 was made to be about 3 mm, and although this dimension is not restricted to this particular value, if this dimension is too short, the beneficial effect is diminished, and if it is too long, it is not only wasteful of the diamond powder, but it can lead to degradation of the surface quality when there is a radial dimensional difference in the pair of cutting edges 27. Therefore, the dimension e of the hard part 30 is preferably in the range of 2.4 to 4.0 mm.

Further in this embodiment, the cutting edge 27 is constructed of primary and secondary cutting edges 27a and 27b whose point angles progressively become smaller.

The design feature of having the secondary cutting edges 27b of smaller point angle is effective in preventing the problem of burr formation, on exiting the drilled hole for example, caused by the spreading action of the conventional drills, by enabling the drill bit to be guided smoothly in the axial direction. Such a drilling mode will permit holes of a high quality to be made even in difficult to drill material such as CFRP.

The design feature of having the primary cutting edges 27a of a larger point angle leads to a large intersecting angle a the intersection of the flank surface 26a with the axis O of the body 21. Therefore, it becomes possible to locate the tubular passage 28 closer to the center C permitting its opening 29 to be located closer to the center C of the body 21. (If the point angle becomes as large as 90°, the center of the airhole coincides with the axial center O.) This feature permits the air and lubricant to be delivered to prevent a temperature rise on biting, which can cause critical material degradation in such materials as CFRP. This feature also promotes effective chip removal.

The large point angle for the cutting edge 27 makes it possible to shorten the drill length. This feature aids in shortening the time required for drilling a through hole, thereby improving the drilling productivity. This feature also makes the drill sturdier and is effective in preventing chipping and otherwise damaging the cutting edge, thereby improving its service life.

The point angles $\alpha$ and $\beta$ of the primary cutting edge 27a and the secondary cutting edge 27b were chosen, respectively, to be 60° and 30° in this embodiment. The preferred range of the point angle is 50° to 70° for $\alpha$, and 20° to 40° for $\beta$.

The selection of the point angle is made in consideration of the relative relationship of the two cutting edges. If the primary angle $\alpha$ is too small, the secondary angle $\beta$ must correspondingly be made small, and conversely if $\alpha$ is large $\beta$ is correspondingly large. In either case, the merits of providing two cutting edges of differing point angle become lost.

In terms of the cutting performance, a large point angle $\alpha$ results in spreading action and poor guiding ability of the drill bit while if the point angle $\beta$ is too small, the size of the hard part 30 in the radial direction becomes small, and the resulting drill bit will not provide a sufficient wear protection.

The performance of the invented drill bit was demonstrated in the following experimental trials. The drills shown in FIGS. 1 to 3 were used to drill through holes of 6.350 mm in CFRP materials of 8 mm thickness. The parameters investigated were: the degree of burr formation at the hole exit, spread value, surface roughness, temperature generation and drill service life. The point angles of $\alpha$ and $\beta$, the dimension e of the hard part 30, were the same as in the preferred embodiment described above, and the hard part 30 was made of sintered material consisting mostly of diamond powder.

The results are summarized in Table 1. The spread value refers to the difference in the diameter of the hole intended and that of the hole actually drilled, and are shown as the value of difference in mm. The reason the results exhibit negative values is that, because the fabricated material is CFRP, there is a tendency for the hole to shrink after drilling.

Figure 4:
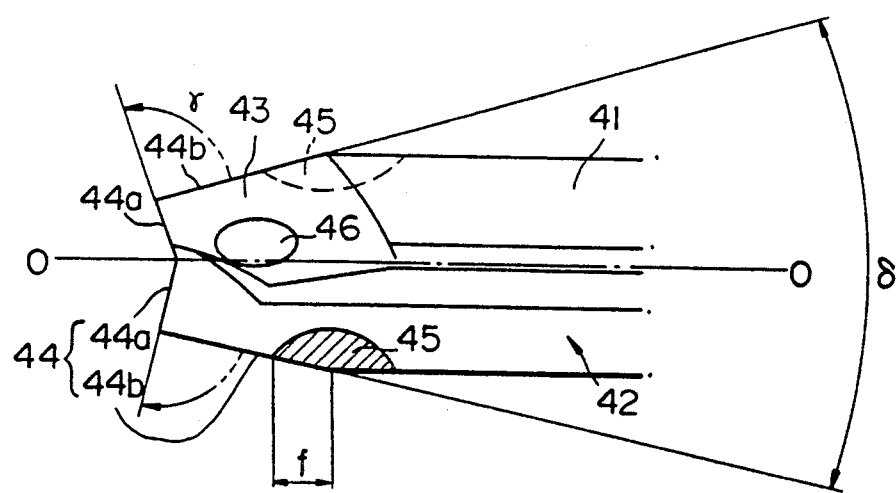
FIG. 4 is an enlarged side view of a comparative test drill used in comparative performance testing.
Figure 5:
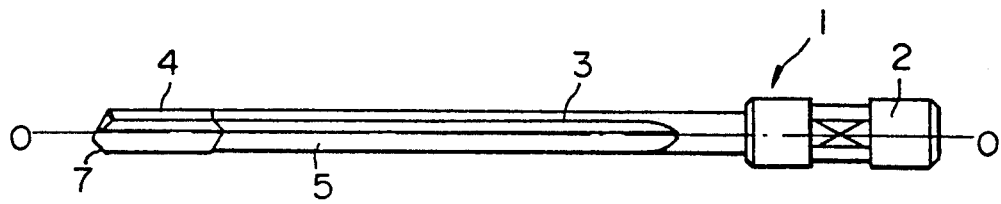
FIG. 5 is a gun drill of the conventional design.
Figure 6:
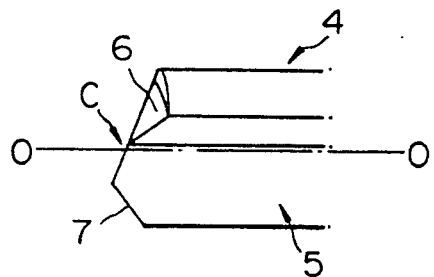
FIG. 6 is an enlarged side view of the gun drill shown in FIG. 5.
Figure 7:
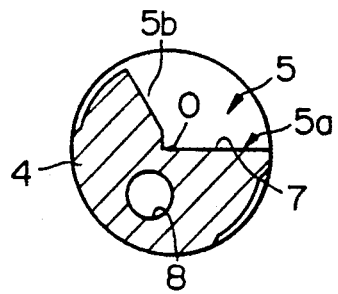
FIG. 7 is an enlarged end view taken from the tip end of the drill tip shown in FIG. 6.
Figure 8:
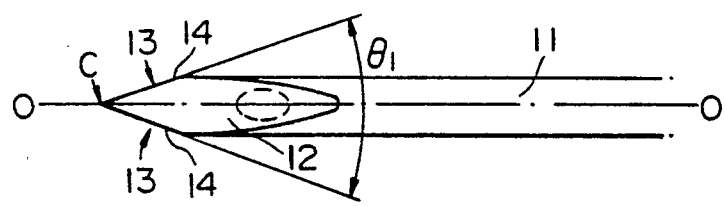
FIG. 8 is an enlarged side view of a flat flute drill of the conventional design.
Figure 9:
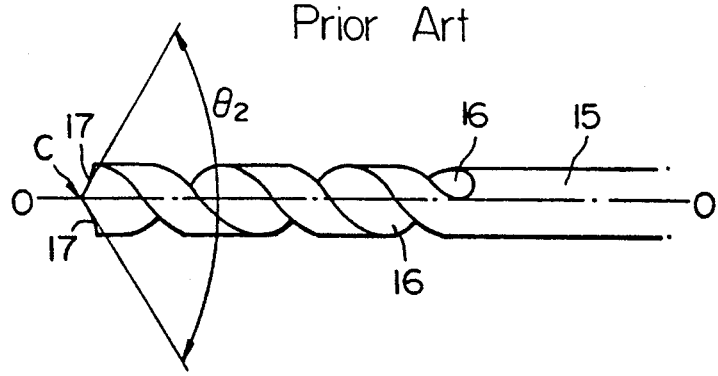
FIG. 9 is a side view of a twist drill of the conventional design.

At the same time, another drill bit shown in FIG. 4 was prepared for comparative evaluation purposes, and this drill bit was used to fabricate holes of 6.350 mm diameter in CFRP materials. This experimental drill bit was also provided with a cutting bit 41 made of a high-hardness sintered material, and along the drill axis O, a pair of flutes 42 were provided for chip removal.

The experimental drill bit was provided at its tip with flank surfaces 43 orienting toward the trailing of the rotation direction, and connecting with the opening of the flute 42. A pair of cutting edges 44 is formed along the intersecting ridges formed by the intersection of the vertical walls 25a (which faces in the direction of rotation viewed from the base side) and the leading flank surface 43, starting from the center C and reaching to the circumference of the cutting bit 41.

At the circumference of the cutting edge 44 is provided a pair of hard part 45 made of sintered material consisting primarily of diamond powder. The body of the drill bit was provided with a pair of tubular passages following the drill axis and having openings in the flank 43 and forming airholes 43.

The cutting edge 44 of this experimental drill bit was provided with a pair of primary cutting edge 44a which is progressively oriented in the drilling direction as it progress from the center C to the outer periphery; and a pair of secondary cutting edges 44b which join with the primary cutting edges 44a and become wider towards the base of the body. As shown in FIG. 4, the point angle, Γ, of the pair of primary cutting edges 44a is set at 90°, and the point angle, δ, of the secondary cutting edges 44b is set at 20°. The linear distance "f" of the hard part 45 is set to be about 3 mm.

The comparative results are shown in Table 1 below. The drilling was performed at 2,000 rpm at a feed rate of 30 mm/min.

TABLE 1

|  | Embodiment | Comparison |
| --- | --- | --- |
| Burr | No burrs to 60th hole | Burrs at 3rd hole |
| Spreading | −18 to −30 μm | −11 to −16 μm |
| Surface Roughness |  |  |
| Rz | 4 to 8 s | 3 to 6 s |
| Ry | 6 to 12 s | 4 to 11 s |
| Temperature Rise | Slight | Slight |
| Wear Resistance | over 100 holes | Drill body broke at 25th hole |

The surface roughness was measured according to the procedure described in JIS B 0601 (Japanese Industrial Standard).

The results in Table demonstrate that the invented drill bit outperformed the comparison drill bit overall, by suppressing the formation of burrs and spreading. In the comparison drill bit, the burrs started to form early in the test, and the degree of spread was also judged to be inferior to the invented drill bit.

The higher degree of spread caused by the comparison drill bit is thought to be due to the shape of the primary cutting edges 44a of the cutting edges 44. They are not only protruding in the drilling direction but also the intersections of the primary and the secondary cutting edges, 44a and 44b respectively, form the leading edges. Compared with the invented drill bit, in which the leading cutting center C is guided and supported by the circumferential cutting edges 27 and hard part 30, in the comparison drill bit, the leading portion of the cutting edges 44a perform all the functions of biting and guiding the secondary cutting edges 44. The end result is the rapid wear of the leading cutting edges in the comparison drill bit, and the consequent increase in the thrust force.

With respect to surface roughness and temperature rise, both drills were judged to perform at about the same level.

With respect to service life, the invented drill bit was able to outperform the conventional drills, such as gun drills, flat flute drills and twist drills, by a wide margin. In contrast, the comparison drill bit was unable to demonstrate sufficient increase in service life. This is also thought to be due to the increase in the thrust loading caused by blunting of the from cutting edges 44, and the consequent overloading of the shaft body.

What is claimed is:

1. A drilling bit for making precision drill holes in workpieces, the drilling bit having a cylindrical body extending between a forward end and a rear end thereof, the cylindrical body having;
    an axis of rotation extending longitudinally through the cylindrical body so that the drilling bit is functionally rotatable thereabout in one direction;
    two flutes formed i a lateral peripheral surface of said cylindrical body so as to extend longitudinally from said forward end, each flute having a wall facing toward the direction of rotation;
    two flanks formed at said forward end of the cylindrical body;
    two cutting edges formed along respective intersections of the flanks and said walls of the flutes, said cutting edges slanting to the rear end; and
    a pair of tubular air holes having openings at said two flanks respectively and extending from said openings to said rear end through said cylindrical body;
    two hard portions provided at each circumferential portion of said cutting edges respectively, said hard portions being harder than other portions of said cutting edges.

2. A drilling bit according to claim 1, in which at least the center portion of said cutting edge is made of a high-hardness sintered material, and said hard portion is made of a super-hard sintered material.

3. A drilling bit according to claim 2, in which said super-hard sintered material has diamond as its main component.

4. A drilling bit according to one of claims 1, 2, or 3, in which each cutting edge consists essentially of a primary cutting edge and a secondary cutting edge, said secondary cutting edge is formed integrally with and away from said primary cutting edge toward said rear end of said body, and a point angle of said primary cutting edge is larger than a point angle of said secondary cutting edge.

5. A drilling bit according to claim 4, in which said point angle of said primary cutting edge is in the range of 50° to 70° and said point angle of said secondary cutting edge is in the range of 20° to 40°.

6. A drilling bit according to one of claims 1, 2, or 3, in which the linear dimension along the axis of said hard portion is in the range between 2.4 mm to 4.0 mm.

* * * * *

UNITED STATES PATENT AND TRADEMARK OFFICE
CERTIFICATE OF CORRECTION

PATENT NO. : 5,217,332
DATED : June 8, 1993
INVENTOR(S) : Kazuo Takasaki, et al.

It is certified that error appears in the above-indentified patent and that said Letters Patent is hereby corrected as shown below:

```
Column 1, line 7:   "a"  should read as --as--
Column 1, line 37:  "a"  should read as --as--
Column 5, line 28:  "a"  should read as --an--
Column 5, line 52:  "mean"  should read as
--means--
Column 6, line 14:  "bas"  should read as --base--
Column 6, line 50:  after "tertiary" insert
--flank--
Column 7, line 65:  "a"  should read as --at--
Column 8, line 2:   "90°"  should read as --90°--
Column 10, line 20, Claim 1:  "i a "  should
read as --in a--
```

Signed and Sealed this

Twenty-ninth Day of March, 1994

Attest:

BRUCE LEHMAN

Attesting Officer

Commissioner of Patents and Trademarks